US012596281B2

(12) United States Patent
Elhadj

(10) Patent No.: US 12,596,281 B2
(45) Date of Patent: Apr. 7, 2026

(54) MONOLITHIC SEMICONDUCTOR-BASED OPTICALLY ADDRESSABLE LIGHT VALVE COMPRISING A LIQUID CRYSTAL LAYER

(71) Applicant: Seurat Technologies, Inc., Wilmington, MA (US)

(72) Inventor: Selim Elhadj, Lexington, MA (US)

(73) Assignee: Seurat Technologies, Inc., Wilmington, MA (US)

( * ) Notice: Subject to any disclaimer, the term of this patent is extended or adjusted under 35 U.S.C. 154(b) by 211 days.

(21) Appl. No.: 18/499,677

(22) Filed: Nov. 1, 2023

(65) Prior Publication Data

US 2024/0152009 A1    May 9, 2024

Related U.S. Application Data

(60) Provisional application No. 63/422,571, filed on Nov. 4, 2022.

(51) Int. Cl.
*G02F 1/135* (2006.01)

(52) U.S. Cl.
CPC .......... *G02F 1/1355* (2021.01); *G02F 1/1352* (2021.01); *G02F 1/1357* (2021.01)

(58) Field of Classification Search
CPC .... G02F 1/1355; G02F 1/1352; G02F 1/1357; G02F 1/0126; G02F 2203/48; G02F 2201/38; G02F 2202/10; G02F 2202/12
See application file for complete search history.

(56) References Cited

U.S. PATENT DOCUMENTS

| | | | | |
|---|---|---|---|---|
| 5,132,814 | A | * | 7/1992 | Ohkouchi ............. G02F 1/1354 |
| | | | | 349/86 |
| 5,500,491 | A | | 3/1996 | Watanabe |
| 5,876,891 | A | | 3/1999 | Takimoto et al. |
| 2008/0239458 | A1 | * | 10/2008 | Sachs ................... G02B 27/149 |
| | | | | 348/E9.027 |
| 2012/0099035 | A1 | | 4/2012 | Burgess |
| 2023/0327400 | A1 | * | 10/2023 | Voss ...................... H01S 5/0421 |
| | | | | 372/44.01 |

FOREIGN PATENT DOCUMENTS

| | | | | | |
|---|---|---|---|---|---|
| CN | 109445197 | A | * | 3/2019 | ....... G02F 1/133707 |
| CN | 108919570 | B | * | 6/2021 | ....... G02F 1/133723 |

* cited by examiner

*Primary Examiner* — Paul C Lee

(74) *Attorney, Agent, or Firm* — David R. Stevens; Stevens Law Group

(57) ABSTRACT

A monolithic transmissive or reflective light valve system able to withstand operation with high optical fluence and high average power lasers is described. The light valve includes a liquid crystal layer on an alignment layer, a first epitaxial doped semiconductor transparent electrode on a photoconductor layer made of a first wide bandgap or ultrawide bandgap semi- insulating semiconductor layer (or wafer). A second epitaxial semiconductor transparent electrode layer brackets the light valve and includes a second wide bandgap or ultrawide bandgap semi-insulating, or conductive semiconductor layer (or wafer). In some embodiments, the doped epitaxial or ion implanted transparent electrode and photoconductor layers have matched coefficient of thermal expansion (CTE) and further matched CTE to the second wide bandgap material bracketing the light valve. In some embodiments, the transparent electrode and photoconductor layers have matched index of refraction, along with matched photoexcitation levels.

10 Claims, 6 Drawing Sheets

200B

High Power Laser

| AR coating |
| $Al_2O_3$ passivation ($HfO_2/SiO_2$) |

| n-epi GaN |

| Fe-GaN Semi-Insulating (SI) wafer |

| First Alignment Layer |

| Liquid crystal (LC) |

| Second Alignment Layer |

| AR coating |
| $Al_2O_3$ passivation ($HfO_2/SiO_2$) |

| Fe-GaN Semi-Insulating (SI) wafer |

| n-epi GaN |

| AR coating |
| $Al_2O_3$ passivation ($HfO_2/SiO_2$) |

$V_{ac}$

Spatially Modulated Laser

Fig. 2B

MONOLITHIC SEMICONDUCTOR-BASED OPTICALLY ADDRESSABLE LIGHT VALVE COMPRISING A LIQUID CRYSTAL LAYER

RELATED APPLICATION

The present disclosure is part of a non-provisional patent application claiming the priority benefit of U.S. Patent Application No. 63/422,571, filed on Nov. 4, 2022, which is incorporated by reference in its entirety.

TECHNICAL FIELD

The present disclosure generally relates to a system and method for high throughput laser manufacturing. In one embodiment, laser manufacturing is supported by use of spatial light modulators including semiconductor based high power transmissive or reflective light valves.

BACKGROUND

A spatial light modulator imposes some form of spatially varying modulation on a beam of light. An SLM typically modulates the intensity of the light beam. However, it is also possible to produce devices that modulate the polarization or phase of the beam or both the intensity and the phase simultaneously.

An image created by an electrically addressed spatial light modulator can be created and changed electronically, as in most electronic displays. Light modulators can be used to completely or partially block, redirect, or modulate laser light. For example, a spatial light modulator (SLM), also known as a light valve (LV), is one type of light modulator that can be used to impress information equally across the entire beam (1D modulation), provide variation across the beam to form parallelized optical channels (2D modulation), or provide variations across a volume of pixels/voxels channels (3D modulation). The information imposed can be in the form of amplitude, phase, polarization, wavelength, coherency, or quantum entanglement.

Industrial applications can require that LVs withstand high fluence and high energy laser sources for a prolonged period of time. This allows production of multiple build or processing cycles using a typical shot count in the tens of millions to billions (where the printing of a 2D area is equal to one frame off the LV to the print bed). A requirement of LV lifetime in a typical industrial system is >10E6 shots and is ideally >10E9 shots. The light source intensity required to print materials in a reasonable time can exceed 8 J/cm² at the print plane, including kW levels of average optical power. While various methods can be used to reduce the fluence at the LV, commercially practicable industrial processing requires that the energy density at the LV to be not <2 J/cm². Existing LVs fail at far below this fluence and power levels making use of existing LVs in metal AM system impractical.

Typically, elements that fail (or cause failure) within typical LVs are the Transparent Conductive Electrodes (TCE), alignment layers, and liquid crystal layers (linear electro-optic or LEO material) and photoconductor layers. To prevent material failures, improved light valves and light valve materials able to tolerate conditions needed for high speed industrial manufacturing are needed.

SUMMARY

In some embodiments, a transmissive light valve system includes a liquid crystal layer and a first transparent electrode layer on a photoconductor semi-insulating semiconductor layer or a photoconductor in the form of a wafer substrate. A second transparent electrode layer comprising a second wide bandgap or ultra wide bandgap semiconductor layer and a second semiconductor transparent conductive electrode is positioned to bracket or sandwich the liquid crystal and alignment layers. In some embodiments one or more of the photoconductor layers or wafers and electrode layers are selected to be CTE matched.

In some embodiments, first and second wide bandgap (with bandgaps greater than 3 eV) or ultra wide bandgap (with bandgaps greater than 4 eV) semiconductor layers can be used.

In some embodiments, the first and second wide bandgap or ultra wide bandgap semiconductor layers comprise at least one of a Gallium Nitride (GaN) intrinsic semi-insulating layer, an Iron Fe-doped GaN semi-insulating layer, a Carbon C-doped GaN semi-insulating layer, a Manganese Mg-doped semi-insulating, and a Vanadium V-doped Silicon Carbide (SiC) semi-insulating layer, or any other type of doping-compensated or intrinsic semi-insulating layer or wafer.

In some embodiments, the first and second transparent conductive electrode comprise at least one of n or p epitaxial (epi) doped -epi GaN, epi SiC, epi $Ga_2O_3$, epi Diamond, epi Aluminum Nitride (AlN), or other epitaxially grown wide bandgap or ultra wide band gap semiconductors or, alternatively, a semi-insulating semiconductor with ion implanted dopants forming a conductive transparent layer, or simply by using a doped conductive semiconductor wafer that act as both a transparent conductive electrode and a substrates that supports the LV device.

In some embodiments, a first alignment layer can be positioned between the first transparent conductive electrode and the liquid crystal; and a second alignment layer positioned between the second transparent conductive electrode bracketing the liquid crystal.

In some embodiments, at least one of the first and second alignment layers comprises a grown or deposited inorganic layer on a substrate.

In some embodiments, the liquid crystal layer, the first and second transparent electrode and photoconductor layers, the first and second alignment layers, together form a monolithic stack of the same matrix material or a crystallographically matched epitaxial layer of another material.

In some embodiments, at least one antireflective (AR) coating is positioned to contact at least one of the first and second transparent electrode photoconductor layers and the first and second alignment layers, and together forming a monolithic stack when high refractive index and low refractive index layers are included and formed by adjusting the dopant profiles in each individual layer in the multilayer forming the anti-reflective coating design.

In some embodiments, the light valve operates with an energy fluence greater than 2 Joules/cm² and/or at kW levels of average power.

In some embodiments, a monolithic transmissive light valve system includes a liquid crystal layer. The liquid crystal layer is positioned between a first transparent electrode and photoconductor layer including a first wide bandgap or ultra-wide bandgap semiconductor layer and a first transparent conductive electrode; and a second transparent electrode layer including a second wide bandgap or ultra-wide bandgap semiconductor layer and a second transparent conductive electrode. In some embodiments a plurality of alignment layers and antireflective layers can be monolithically formed on at least one of the first transparent electrode and photoconductor layer, first transparent conductive electrode, second transparent electrode photoconductor layer, and second transparent conductive electrode.

In some embodiments, a process for manufacturing a transmissive light valve system includes the steps of providing a liquid crystal layer and positioning a first transparent electrode and a first photoconductor layer comprising a first wide bandgap or ultra wide bandgap semiconductor layer in contact with the liquid crystal layer. A second transparent electrode layer on a second wide bandgap or ultra wide bandgap semiconductor layer is also positioned in contact with the alignment layer that supports the liquid crystal layer. Alternatively, a second transparent conductive electrode that also acts as a substrate is in contact with alignment layer that supports the liquid crystal.

In some embodiments, a reflective light valve system, includes a transparent electrode on a photoconductor layer or a photoconductor wafer comprising a first wide bandgap or ultra wide bandgap semi-insulating semiconductor and a light reflective layer contacting the photoconductor. The systems further include a transparent conductive electrode and a liquid crystal layer with alignment layer positioned between the reflective layer and the transparent conductive electrode, or another transparent electrode on a photoconductor layer or a photoconductor wafer comprising a second wide or ultra wide bandgap semi-insulating semiconductor substrate.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIG. 2B illustrates one embodiment of a monolithic, transmissive light valve including an iron doped Fe-GaN semi-insulating wafer;

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Figure 1A:
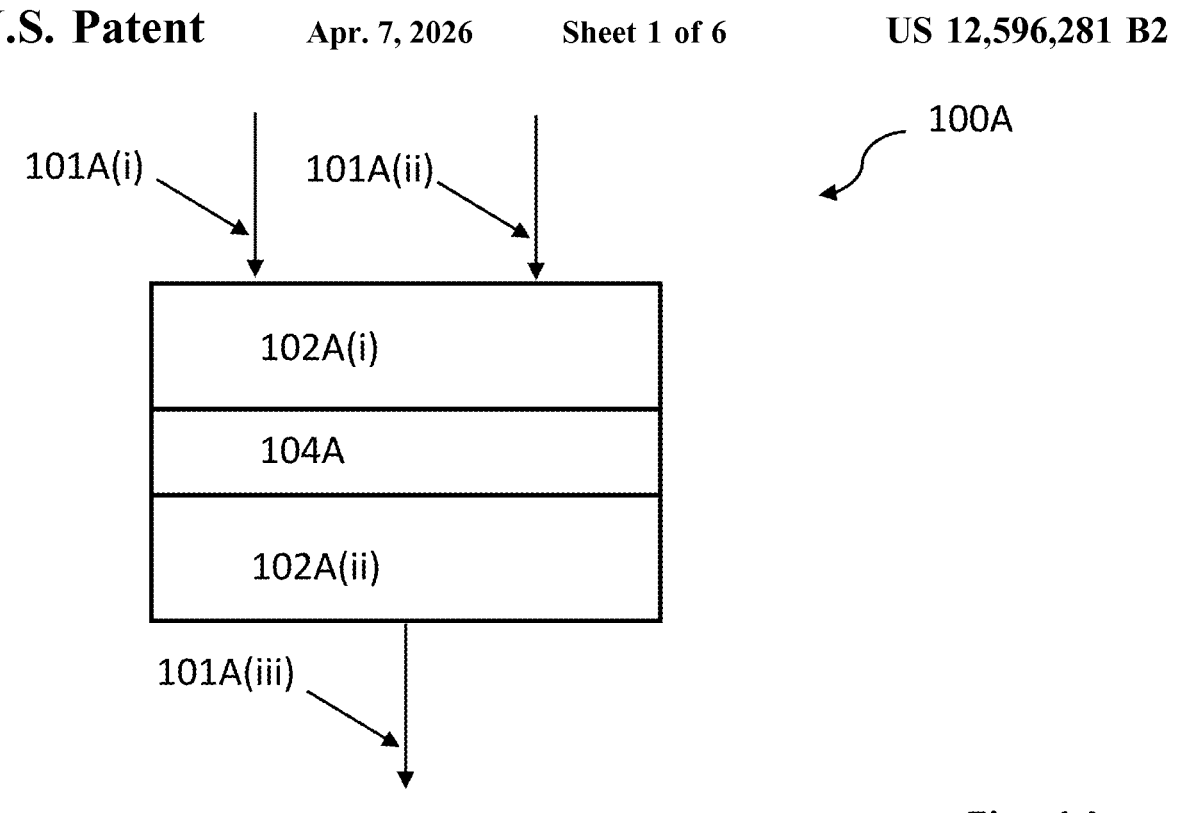
FIG. 1A illustrates a monolithic, transmissive light valve usable in an additive manufacturing system.

FIG. 1A illustrates a one embodiment of a monolithic and high power capable transmissive light valve suitable for use in additive manufacturing systems or other application benefiting from long light valve lifetime when used at energy densities greater than 2 Joules/cm$^2$, kW levels of power, 10's of Joules energy over many cm$^2$ area. In one embodiment, a monolithic transmissive light valve system 100A includes a liquid crystal layer 104A. The liquid crystal layer 104A is positioned between first and second light patterning layers 102A(i) and 102A(ii). The liquid crystal layer 104A and first and second light patterning layers 102A(i) and 102A(ii) can be combined to form a monolithic block that resists delamination or layer separation and have CTE and refractive index matching within layers and between layers bracketing 104A. In some embodiments, the first and second light patterning layers 102A(i) and 102A(ii) can have their respective coefficients of thermal expansion (CTE) matched to be within 10%, within 5%, or within 1% of each other Further, the first and second light patterning layers 102A(i) and 102A(ii) can have their CTEs matched to be within 10%, within 5%, or within 1% of each other and the liquid crystal layer 104A. Advantageously, closely matching CTEs promote even expansion of the monolithic transmissive light valve system 100A when heated by lasers(s), while, if using the same mostly transparent materials for each layer, will yield balanced light absorption between layers and heating, such that bottom and top layers experience the same temperature rise to minimize thermomechanical strain and stress cycle, fatigue, and damage to extend device lifetime In some embodiments, the first light patterning layer 102A(i) can be formed from a first transparent electrode on top of a first wide bandgap or ultra wide bandgap semiconductor layer. Similarly, the second light patterning layer 102A(ii) can be formed from a second transparent electrode layer including a second wide bandgap semiconductor layer. In some embodiments a plurality of alignment layers and antireflective layers can be monolithically formed on at least one of the first transparent electrode semiconductor and a first photoconductor semiconductor layer, a second semiconductor photoconductor layer, and a second semiconductor transparent conductive electrode.

In operation, an addressing laser light 101A(i) creates a spatial pattern that, in combination with polarizers, selectively results in blocking or transmitting laser light passing through the laser light valve system 100A. A high fluence, high power, and high energy input light 101A(ii) is directed to pass through the laser light valve system 100A, is spatially patterned, and becomes output light 101A(iii). This light can be directed to heat a powder bed suitable for additive manufacturing as later described with respect to FIGS. 3, 4, and 5.

Figure 1B:
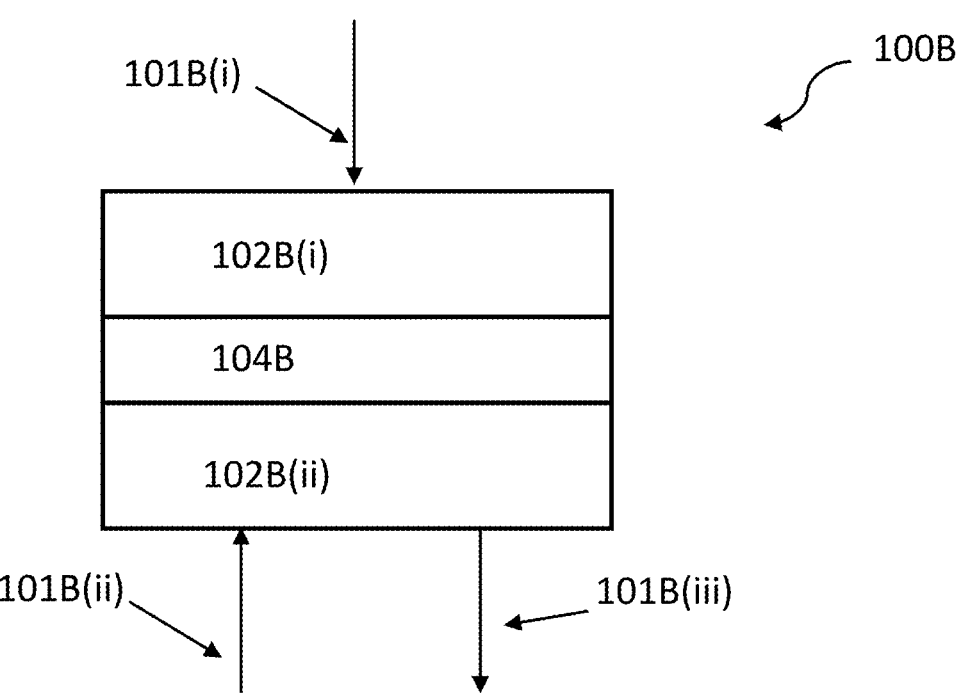
FIG. 1B illustrates a monolithic, reflective light valve usable in an additive manufacturing system.

FIG. 1B illustrates a one embodiment of a monolithic, high fluence, high power and high energy reflective light valve suitable for use in additive manufacturing systems or other application benefiting from long light valve lifetime when used at energy densities greater than 2 Joules/cm$^2$. In one embodiment, a monolithic reflective light valve system 100B includes a liquid crystal layer 104B. The liquid crystal layer 104B is positioned between first and second light patterning layers 102B(i) and 102B(ii). The liquid crystal layer 104B and first and second light patterning layers 102B(i) and 102B(ii) can be combined to form a monolithic block that resists delamination or layer separation, have CTE and refractive index matching within layers and between layers bracketing 104B. In some embodiments, the first and second light patterning layers 102B(i) and 102B(ii) can have their respective coefficients of thermal expansion (CTE) matched to be within 10%, within 5%, or within 1% of each other Further, the first and second light patterning layers 102B(i) and 102B(ii) can have their CTEs matched to be within 10%, within 5%, or within 1% of each other and the liquid crystal layer 104A. Advantageously, closely matching CTEs promote even expansion of the monolithic transmissive light valve system 100B when heated by lasers(s), while, if using the same mostly transparent materials for each layer, will yield balanced light absorption between layers and heating, such that bottom and top layers experience the same temperature rise to minimize thermomechanical strain and stress cycle, fatigue, and damage and extend lifetime. Furthermore, the levels of light-induced semiconductor excitation in the photoconductor layers can also be balanced or closely matched to withing less than 1 percent to yield a top-to-bottom a more tightly bound electric field applied to the liquid crystal, which can improve patterning spatial resolution.

In some embodiments, the first light patterning layer 102B(i) can be formed from a first transparent electrode semiconductor layer including a first wide bandgap or ultra wide bandgap photoconductor semiconductor and a reflective layer (e.g. dielectric mirror, or doped semiconductor multilayer). The second light patterning layer 102B(ii) can be formed from a second semiconductor transparent electrode layer and a wide bandgap or ultra wide bandgap photoconductor semiconductor layer. In some embodiments a plurality of alignment layers and antireflective layers can be monolithically formed on at least one of the first transparent electrode and photoconductor layer, a first transparent conductive electrode, a second transparent electrode and photoconductor layer, and a second transparent conductive electrode.

In operation, an addressing laser light 101B(i) creates a spatial pattern that selectively results in blocking or transmitting laser light reflecting through the laser light valve system 100B. A high fluence, high power, and high energy input light 101B(ii) is directed to pass into the laser light valve system 100B, is spatially patterned, reflected, and becomes output light 101B(iii). This light can be directed to heat a powder bed suitable for additive manufacturing as later described with respect to FIGS. 3, 4, and 5.

Figure 2A:
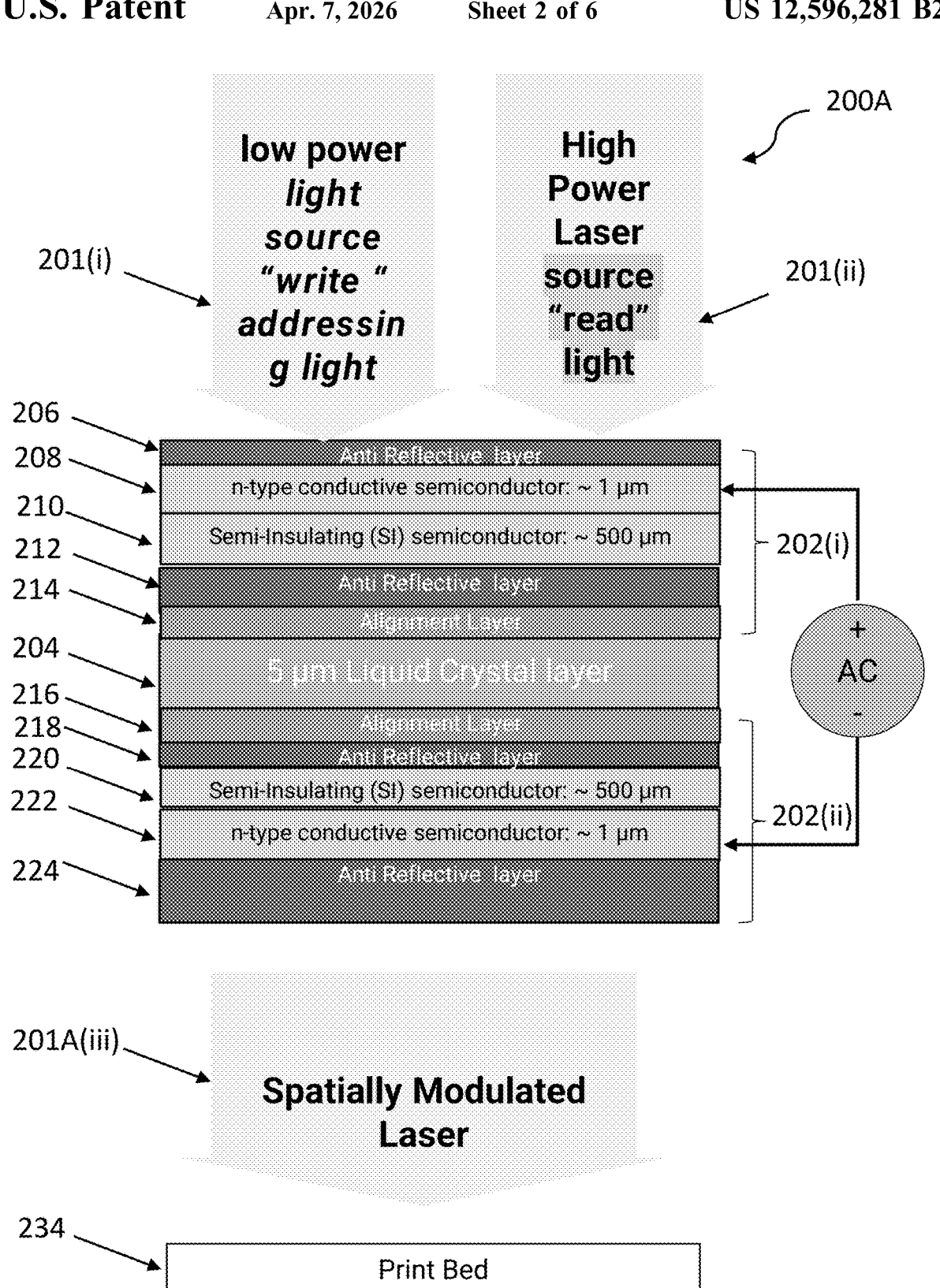
FIG. 2A illustrates one embodiment of a monolithic, transmissive light valve.

FIG. 2A illustrates a one embodiment of a monolithic, high fluence, high power, and high energy transmissive light valve 200A that includes light patterning layer stacks 202(i) and 202(ii) that bracket or sandwich a liquid crystal 204. From top to bottom, layer 206 is an antireflective (AR) layer, layer 208 is a n-type conductive semiconductor produced, for example, by ion implantation or physical vapor deposition or epitaxial growth, and layer 210 is a photoconductive Semi-Insulating (SI) semiconductor. The semi-insulating semiconductor can be intrinsic or extrinsic (doped, compensated). Another antireflective layer 212 is stacked on an alignment layer 214. The alignment layer 214 grown or deposited on a 5 micron thick liquid crystal layer 204, completing the light patterning stack 202(i). Below the liquid crystal layer 204 is the second light patterning layer stack 202(ii) that includes an alignment layer 216 stacked on an antireflective layer 218. Next in the stack is layer 210 is a layer 220 formed by a Semi-Insulating (SI) semiconductor and a layer 222 formed by a n-type transparent conductive semiconductor. The second light patterning layer stack 202 (ii) is completed by an antireflective layer 224.

In operation, an addressing ("write") laser light 201B(i) creates a spatial pattern that selectively results in blocking or transmitting, or partially transmitting ("gray scaling"), the "read" laser light passing through the light valve system 200A. A high fluence, high power, and high energy input read light 201A(ii) is directed to pass into the laser light valve system 200A, is spatially patterned, transmitted, and becomes the spatially patterned output light 201A(iii). This light can be directed to heat a powder print bed 234 suitable for additive manufacturing as later described with respect to FIGS. 3, 4, and 5.

FIG. 2B illustrates another embodiment of a monolithic, high fluence transmissive light valve 200B similar to that previously described with respect to FIG. 2A. However, in contrast to the embodiment of FIG. 2A which illustrates a Semi-Insulating (SI) semiconductor layer 210 and 220, in FIG. 2B an iron (Fe) doped and compensated Fe-GaN Semi-Insulating (SI) wafer is used. FIG. 2B an epitaxially grown n-epi GaN layer provides a transparent electrode.

Figure 3:
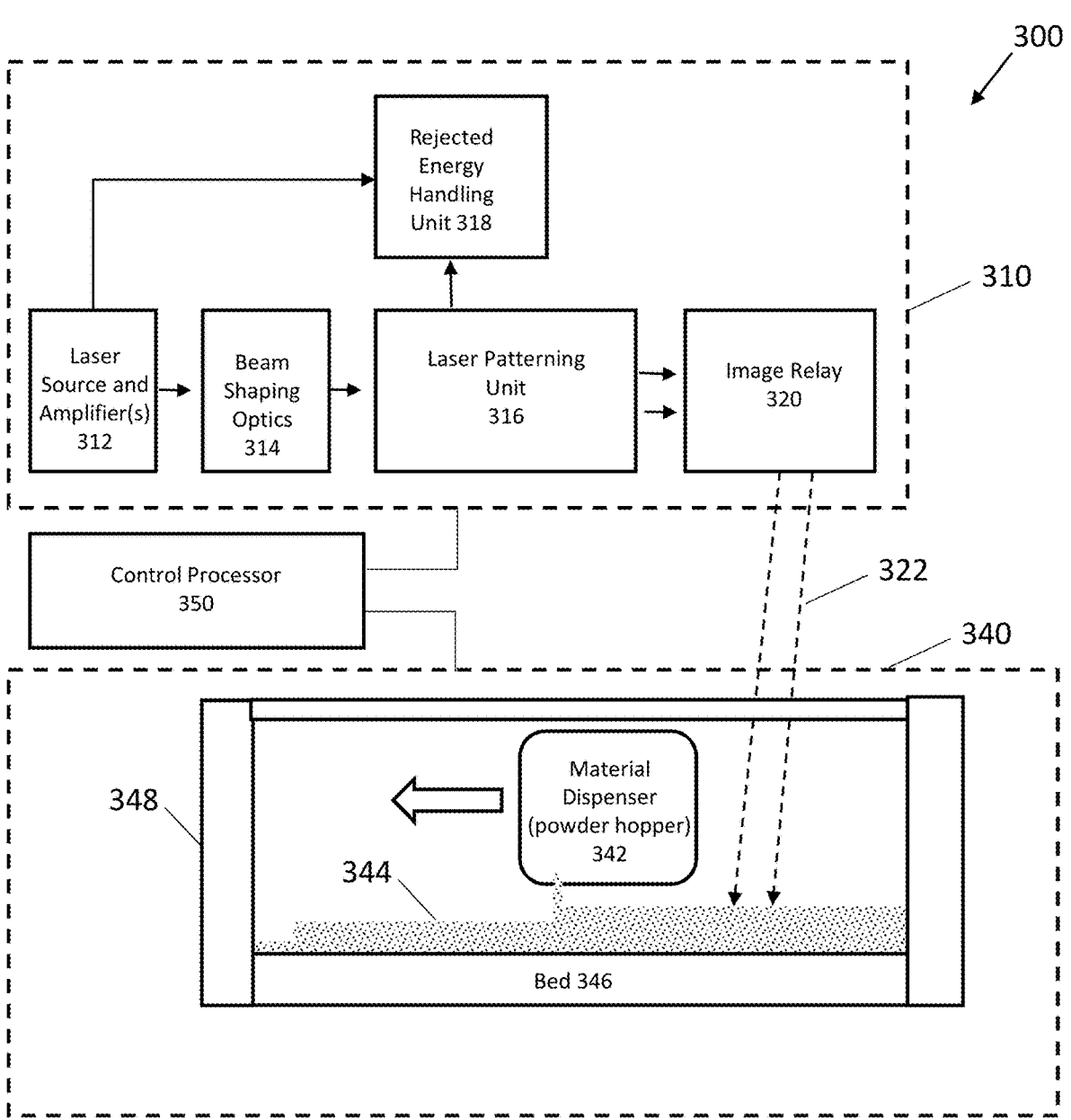
FIG. 3 illustrates an additive manufacturing system able to provide one or two dimensional light beams to a cartridge.

In an embodiment illustrated with respect to FIG. 3, additive manufacturing systems can be represented by various modules that form additive manufacturing method and system 300. As seen in FIG. 3, a laser source and amplifier(s) 312 can be constructed as a continuous or pulsed laser. In other embodiments the laser source includes a pulse electrical signal source such as an arbitrary waveform generator or equivalent acting on a continuous-laser-source such as a laser diode. In some embodiments this could also be accomplished via a fiber laser or fiber launched laser source which is then modulated by an acousto-optic or electro optic modulator. In some embodiments a high repetition rate pulsed source which uses a Pockels cell can be used to create an arbitrary length pulse train.

Possible laser types include, but are not limited to: Gas Lasers, Chemical Lasers, Dye Lasers, Metal Vapor Lasers, Solid State Lasers (e.g. fiber), Semiconductor (e.g. diode) Lasers, Free electron laser, Gas dynamic laser, "Nickel-like" Samarium laser, Raman laser, or Nuclear pumped laser.

A Gas Laser can include lasers such as a Helium-neon laser, Argon laser, Krypton laser, Xenon ion laser, Nitrogen laser, Carbon dioxide laser, Carbon monoxide laser or Excimer laser.

A Chemical laser can include lasers such as a Hydrogen fluoride laser, Deuterium fluoride laser, COIL (Chemical oxygen-iodine laser), or Agil (All gas-phase iodine laser).

A Metal Vapor Laser can include lasers such as a Helium-cadmium (HeCd) metal-vapor laser, Helium-mercury (HeHg) metal-vapor laser, Helium-selenium (HeSe) metal-vapor laser, Helium-silver (HeAg) metal-vapor laser, Strontium Vapor Laser, Neon-copper (NeCu) metal-vapor laser, Copper vapor laser, Gold vapor laser, or Manganese (Mn/MnCl2) vapor laser. Rubidium or other alkali metal vapor lasers can also be used. A Solid State Laser can include lasers such as a Ruby laser, Nd:YAG laser, NdCrYAG laser, Er:YAG laser, Neodymium YLF (Nd:YLF) solid-state laser, Neodymium doped Yttrium orthovanadate(Nd:YVO$_4$) laser, Neodymium doped yttrium calcium oxoborateNd:YCa4O (BO$_3$)3 or simply Nd:YCOB, Neodymium glass(Nd:Glass) laser, Titanium sapphire(Ti:sapphire) laser, Thulium YAG (Tm:YAG) laser, Ytterbium YAG (Yb:YAG) laser, Ytterbium:2O$_3$ (glass or ceramics) laser, Ytterbium doped glass laser (rod, plate/chip, and fiber), Holmium YAG (Ho:YAG) laser, Chromium ZnSe (Cr:ZnSe) laser, Cerium doped lithium strontium (or calcium)aluminum fluoride(Ce:LiSAF, Ce:LiCAF), Promethium 147 doped phosphate glass (147Pm+3:Glass) solid-state laser, Chromium doped chrysoberyl (alexandrite) laser, Erbium doped and erbium-ytterbium co-doped glass lasers, Trivalent uranium doped calcium fluoride (U:CaF$_2$) solid-state laser, Divalent samarium doped calcium fluoride(Sm:CaF$_2$) laser, or F-Center laser.

A Semiconductor Laser can include laser medium types such as GaN, InGaN, AlGaInP, AlGaAs, InGaAsP, GaInP, InGaAs, InGaAsO, GaInAsSb, lead salt, Vertical cavity surface emitting laser (VCSEL), Quantum cascade laser, Hybrid silicon laser, or combinations thereof As illustrated in FIG. 3, the additive manufacturing system 300 uses lasers able to provide one- or two-dimensional controlled directed energy as part of an energy patterning system 310. In some embodiments, one dimensional patterning can be directed as linear or curved strips, as rastered lines, as spiral lines, or in any other suitable form. Two-dimensional patterning can include separated or overlapping tiles, or images with variations in laser intensity. Two-dimensional image patterns having non-square boundaries can be used, overlapping or interpenetrating images can be used, and images can be provided by two or more energy patterning systems. The energy patterning system 310 uses laser source and amplifier(s) 312 to direct one or more continuous or intermittent energy beam(s) toward beam shaping optics 314. After shaping, if necessary, the beam is patterned by an energy patterning unit 316, with generally some energy being directed to a rejected energy handling unit 318. Patterned energy is relayed by image relay 320 toward an article processing unit 340, in one embodiment as a two-dimensional image 322 focused near a bed 346. The article processing unit 340 can include a cartridge such as previously discussed. The article processing unit 340 has plate or bed 346 (with walls 348) that together form a sealed cartridge chamber containing material 344 (e.g. a metal powder) dispensed by powder hopper or other material dispenser 342. Dispensed powder can be created or recycled as discussed in this disclosure. Patterned energy, directed by the image relay 320, can melt, fuse, sinter, amalgamate, change crystal structure, influence stress patterns, or otherwise chemically or physically modify the dispensed and distributed material 344 to form structures with desired properties. A control processor 350 can be connected to variety of sensors, actuators, heating or cooling systems, monitors, and controllers to coordinate operation of the laser source and amplifier(s) 312, beam shaping optics 314, laser patterning unit 316, and image relay 320, as well as any other component of system 300. As will be appreciated, connections can be wired or wireless, continuous or intermittent, and include capability for feedback (for example, thermal heating can be adjusted in response to sensed temperature).

In some embodiments, beam shaping optics 314 can include a great variety of imaging optics to combine, focus, diverge, reflect, refract, homogenize, adjust intensity, adjust frequency, or otherwise shape and direct one or more laser beams received from the laser source and amplifier(s) 312 toward the laser patterning unit 316. In one embodiment, multiple light beams, each having a distinct light wavelength, can be combined using wavelength selective mirrors (e.g. dichroics) or diffractive elements. In other embodiments, multiple beams can be homogenized or combined using multifaceted mirrors, microlenses, and refractive or diffractive optical elements.

A laser patterning unit 316 can include a monolithic light valve as described with reference to FIGS. 1A, 1B. Laser patterning unit 316 can further include static or dynamic energy patterning elements. For example, laser beams can be blocked by masks with fixed or movable elements. To increase flexibility and ease of image patterning, pixel addressable masking, image generation, or transmission can be used. In some embodiments, the laser patterning unit includes addressable light valves as described with reference to FIGS. 1A and 1B, alone or in conjunction with other patterning mechanisms to provide patterning. The light valves can be transmissive, reflective, or use a combination of transmissive and reflective elements. Patterns can be dynamically modified using electrical or optical addressing. In one embodiment, a transmissive optically addressed light valve acts to rotate polarization of light passing through the valve, with optically addressed pixels forming patterns defined by a light projection source. In another embodiment, a reflective optically addressed light valve includes a write beam for modifying polarization of a read beam. In certain embodiments, non-optically addressed light valves can be used. These can include but are not limited to electrically addressable pixel elements, movable mirror or micro-mirror systems, piezo or micro-actuated optical systems, fixed or movable masks, or shields, or any other conventional system able to provide high intensity light patterning.

Rejected energy handling unit 318 is used to disperse, redirect, or utilize energy not patterned and passed through the image relay 320. In one embodiment, the rejected energy handling unit 318 can include passive or active cooling elements that remove heat from both the laser source and amplifier(s) 312 and the laser patterning unit 316. In other embodiments, the rejected energy handling unit can include a "beam dump" to absorb and convert to heat any beam energy not used in defining the laser pattern. In still other embodiments, rejected laser beam energy can be recycled using beam shaping optics 314. Alternatively, or in addition, rejected beam energy can be directed to the article processing unit 340 for heating or further patterning. In certain embodiments, rejected beam energy can be directed to additional energy patterning systems or article processing units.

In one embodiment, a "switchyard" style optical system can be used. Switchyard systems are suitable for reducing the light wasted in the additive manufacturing system as caused by rejection of unwanted light due to the pattern to be printed. A switchyard involves redirections of a complex pattern from its generation (in this case, a plane whereupon a spatial pattern is imparted to structured or unstructured beam) to its delivery through a series of switch points. Each switch point can optionally modify the spatial profile of the incident beam. The switchyard optical system may be utilized in, for example and not limited to, laser-based additive manufacturing techniques where a mask is applied to the light. Advantageously, in various embodiments in accordance with the present disclosure, the thrown-away energy may be recycled in either a homogenized form or as a patterned light that is used to maintain high power efficiency or high throughput rates. Moreover, the thrown-away energy can be recycled and reused to increase intensity to print more difficult materials.

Image relay 320 can receive a patterned image (either one or two-dimensional) from the laser patterning unit 316 directly or through a switchyard and guide it toward the article processing unit 340. In a manner similar to beam shaping optics 314, the image relay 320 can include optics to combine, focus, diverge, reflect, refract, adjust intensity, adjust frequency, or otherwise shape and direct the patterned light. Patterned light can be directed using movable mirrors, prisms, diffractive optical elements, or solid state optical systems that do not require substantial physical movement. One of a plurality of lens assemblies can be configured to provide the incident light having the magnification ratio, with the lens assemblies both a first set of optical lenses and a second sets of optical lenses, and with the second sets of optical lenses being swappable from the lens assemblies. Rotations of one or more sets of mirrors mounted on compensating gantries and a final mirror mounted on a build platform gantry can be used to direct the incident light from a precursor mirror onto a desired location. Translational movements of compensating gantries and the build platform gantry are also able to ensure that distance of the incident light from the precursor mirror the article processing unit 340 is substantially equivalent to the image distance. In effect, this enables a quick change in the optical beam delivery size and intensity across locations of a build area for different materials while ensuring high availability of the system.

The material dispenser 342 (e.g. powder hopper) in article processing unit 340 (e.g. cartridge) can distribute, remove, mix, provide gradations or changes in material type or particle size, or adjust layer thickness of material. The material can include metal, ceramic, glass, polymeric powders, other melt-able material capable of undergoing a thermally induced phase change from solid to liquid and back again, or combinations thereof. The material can further include composites of melt-able material and non-melt-able material where either or both components can be selectively targeted by the imaging relay system to melt the component that is melt-able, while either leaving along the non-melt-able material or causing it to undergo a vaporizing/destroying/combusting or otherwise destructive process. In certain embodiments, slurries, sprays, coatings, wires, strips, or sheets of materials can be used. Unwanted material can be removed for disposable or recycling by use of blowers, vacuum systems, sweeping, vibrating, shaking, tipping, or inversion of the bed 346.

In addition to material handling components, the article processing unit 340 can include components for holding and supporting 3D structures, mechanisms for heating or cooling the chamber, auxiliary or supporting optics, and sensors and control mechanisms for monitoring or adjusting material or environmental conditions. The article processing unit can, in whole or in part, support a vacuum or inert gas atmosphere to reduce unwanted chemical interactions as well as to mitigate the risks of fire or explosion (especially with reactive metals). In some embodiments, various pure or mixtures of other atmospheres can be used, including those containing Ar, He, Ne, Kr, Xe, $CO_2$, $N_2$, $O_2$, $SF_6$, $CH_4$, CO, $N_2O$, $C_2H_2$, $C_2H_4$, $C_2H_6$, $C_3H_6$, $C_3H_8$, i-$C_4H_{10}$, $C_4H_{10}$, 1-$C_4H_8$, cic-2,$C_4H_7$, 1,3-$C_4H_6$, 1,2-$C_4H_6$, $C_5H_{12}$, n-$C_5H_{12}$, i-$C_5H_{12}$, n-$C_6H_{14}$, $C_2H_3Cl$, $C_7H_{16}$, $C_8H_{18}$, $C_{10}H_{22}$, $C_{11}H_{24}$, $C_{12}H_{26}$, $C_{13}H_{28}$, $C_{14}H_{30}$, $C_{15}H_{32}$, $C_{16}H_{34}$, $C_6H_6$, $C_6H_5$-$CH_3$, $C_8H_{10}$, $C_2H_5OH$, $CH_3OH$, i$C_4H_8$. In some embodiments, refrigerants or large inert molecules (including but not limited to sulfur hexafluoride) can be used. An enclosure atmospheric composition to have at least about 1% He by volume (or number density), along with selected percentages of inert/non-reactive gasses can be used.

In certain embodiments, a plurality of article processing units, cartridges, or build chambers, each having a build platform to hold a powder bed, can be used in conjunction with multiple optical-mechanical assemblies arranged to receive and direct the one or more incident energy beams into the cartridges. Multiple cartridges allow for concurrent printing of one or more print jobs.

In another embodiment, one or more article processing units, cartridges, or build chambers can have a cartridge that is maintained at a fixed height, while optics are vertically movable. A distance between final optics of a lens assembly and a top surface of powder bed a may be managed to be essentially constant by indexing final optics upwards, by a distance equivalent to a thickness of a powder layer, while keeping the build platform at a fixed height. Advantageously, as compared to a vertically moving the build platform, large and heavy objects can be more easily manufactured, since precise micron scale movements of the ever changing mass of the build platform are not needed. Typically, build chambers intended for metal powders with a volume more than ~0.1-0.2 cubic meters (i.e., greater than 100-200 liters or heavier than 500-1,000 kg) will most benefit from keeping the build platform at a fixed height.

In one embodiment, a portion of the layer of the powder bed in a cartridge may be selectively melted or fused to form one or more temporary walls out of the fused portion of the layer of the powder bed to contain another portion of the layer of the powder bed on the build platform. In selected embodiments, a fluid passageway can be formed in the one or more first walls to enable improved thermal management.

In some embodiments, the additive manufacturing system can include article processing units or cartridges that supports a powder bed capable of tilting, inverting, and shaking to separate the powder bed substantially from the build platform in a hopper. The powdered material forming the powder bed may be collected in a hopper for reuse in later print jobs. The powder collecting process may be automated and vacuuming or gas jet systems also used to aid powder dislodgement and removal.

Some embodiments, the additive manufacturing system can be configured to easily handle parts longer than an available build chamber or cartridge. A continuous (long) part can be sequentially advanced in a longitudinal direction from a first zone to a second zone. In the first zone, selected granules of a granular material can be amalgamated. In the second zone, unamalgamated granules of the granular material can be removed. The first portion of the continuous part can be advanced from the second zone to a third zone, while a last portion of the continuous part is formed within the first zone and the first portion is maintained in the same position in the lateral and transverse directions that the first portion occupied within the first zone and the second zone. In effect, additive manufacture and clean-up (e.g., separation and/or reclamation of unused or unamalgamated granular material) may be performed in parallel (i.e., at the same time) at different locations or zones on a part conveyor, with no need to stop for removal of granular material and/or parts.

In another embodiment, additive manufacturing capability can be improved by use of an enclosure restricting an exchange of gaseous matter between an interior of the enclosure and an exterior of the enclosure. An airlock provides an interface between the interior and the exterior; with the interior having multiple additive manufacturing chambers, including those supporting power bed fusion. A gas management system maintains gaseous oxygen within the interior at or below a limiting oxygen concentration, increasing flexibility in types of powder and processing that can be used in the system.

In another manufacturing embodiment, capability can be improved by having a article processing units, cartridges, or build chamber contained within an enclosure, the build chamber being able to create a part having a weight greater than or equal to 2,000 kilograms. A gas management system may maintain gaseous oxygen within the enclosure at concentrations below the atmospheric level. In some embodiments, a wheeled vehicle may transport the part from inside the enclosure, through an airlock, since the airlock operates to buffer between a gaseous environment within the enclosure and a gaseous environment outside the enclosure, and to a location exterior to both the enclosure and the airlock.

Other manufacturing embodiments involve collecting powder samples in real-time from the powder bed. An ingester system is used for in-process collection and characterizations of powder samples. The collection may be performed periodically and the results of characterizations result in adjustments to the powder bed fusion process. The ingester system can optionally be used for one or more of audit, process adjustments or actions such as modifying printer parameters or verifying proper use of licensed powder materials.

Yet another improvement to an additive manufacturing process can be provided by use of a manipulator device such as a crane, lifting gantry, robot arm, or similar that allows for the manipulation of parts that can be difficult or impossible for a human to move is described. The manipulator device can grasp various permanent or temporary additively manufactured manipulation points on a part to enable repositioning or maneuvering of the part.

Control processor 350 can be connected to control any components of additive manufacturing system 300 described herein, including lasers, laser amplifiers, optics, heat control, build chambers, and manipulator devices. The control processor 350 can be connected to variety of sensors, actuators, heating or cooling systems, monitors, and controllers to coordinate operation. A wide range of sensors, including imagers, light intensity monitors, thermal, pressure, or gas sensors can be used to provide information used in control or monitoring. The control processor can be a single central controller, or alternatively, can include one or more independent control systems. The controller processor 350 is provided with an interface to allow input of manufacturing instructions. Use of a wide range of sensors allows various feedback control mechanisms that improve quality, manufacturing throughput, and energy efficiency.

Figure 4:
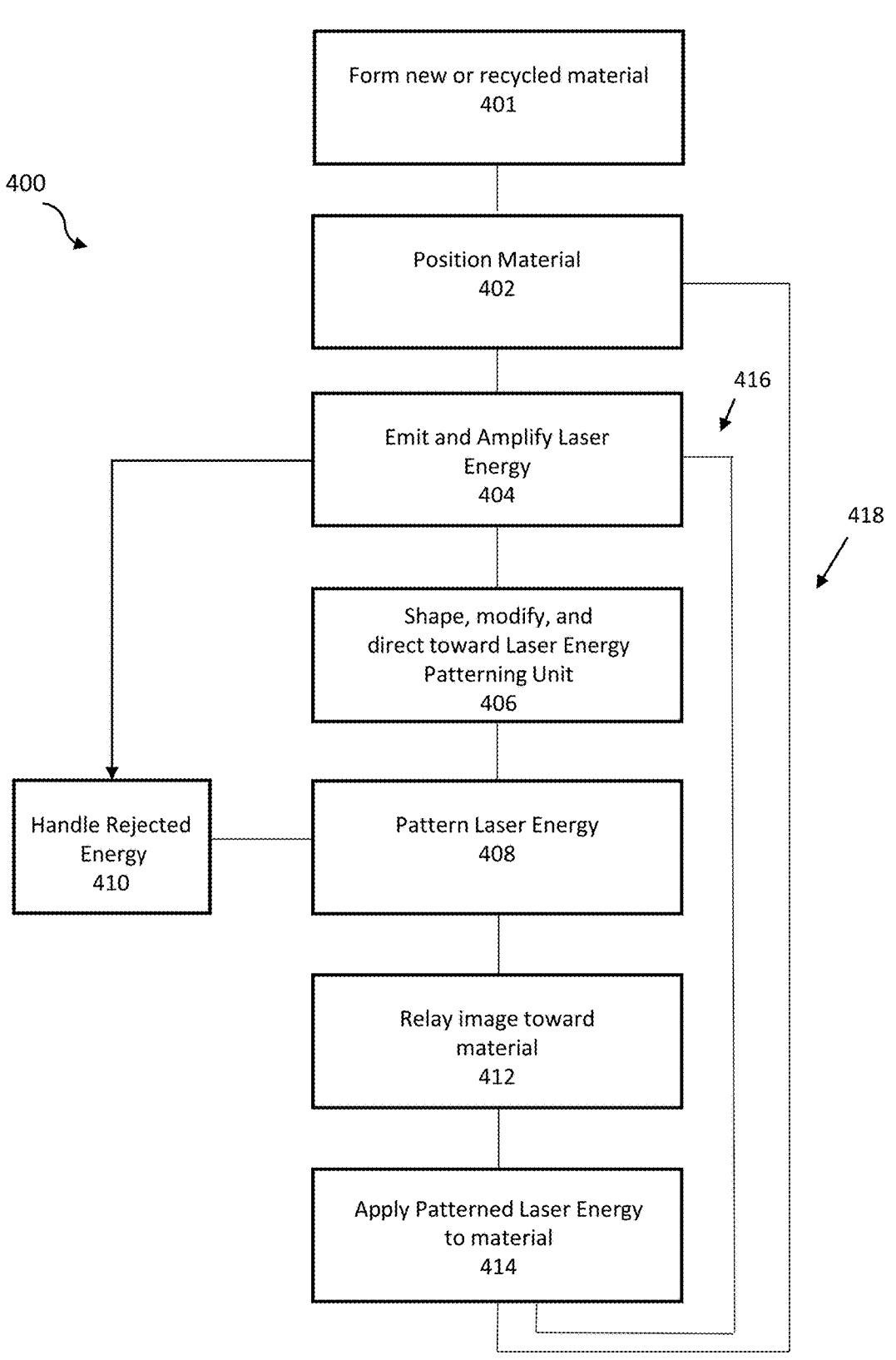
FIG. 4 illustrates a method of operating a cartridge based additive manufacturing system able to provide one or two dimensional light beams to a cartridge.

One embodiment of operation of a manufacturing system suitable for additive or subtractive manufacture is illustrated in FIG. 4. In this embodiment, a flow chart 400 illustrates one embodiment of a manufacturing process supported by the described optical and mechanical components. In step 401, material powder created or recycled as discussed in this disclosure is formed. In step 402, the powder material is positioned in a cartridge, bed, chamber, or other suitable support. In some embodiments, the material can be a metal plate for laser cutting using subtractive manufacture techniques, or a powder capable of being melted, fused, sintered, induced to change crystal structure, have stress patterns influenced, or otherwise chemically or physically modified by additive manufacturing techniques to form structures with desired properties.

In step 404, unpatterned laser energy is emitted by one or more energy emitters, including but not limited to solid state or semiconductor lasers, and then amplified by one or more laser amplifiers. In step 406, the unpatterned laser energy is shaped and modified (e.g. intensity modulated or focused). In step 408, this unpatterned laser energy is patterned, with energy not forming a part of the pattern being handled in step 410 (this can include conversion to waste heat, recycling as patterned or unpatterned energy, or waste heat generated by cooling the laser amplifiers in step 404). In step 412, the patterned energy, now forming a one or two-dimensional image is relayed toward the material. In step 414, the image is applied to the material, either subtractively processing or additively building a portion of a 3D structure. For additive manufacturing, these steps can be repeated (loop 418) until the image (or different and subsequent image) has been applied to all necessary regions of a top layer of the material. When application of energy to the top layer of the material is finished, a new layer can be applied (loop 416) to continue building the 3D structure. These process loops are continued until the 3D structure is complete, when remaining excess material can be removed or recycled.

Figure 5:
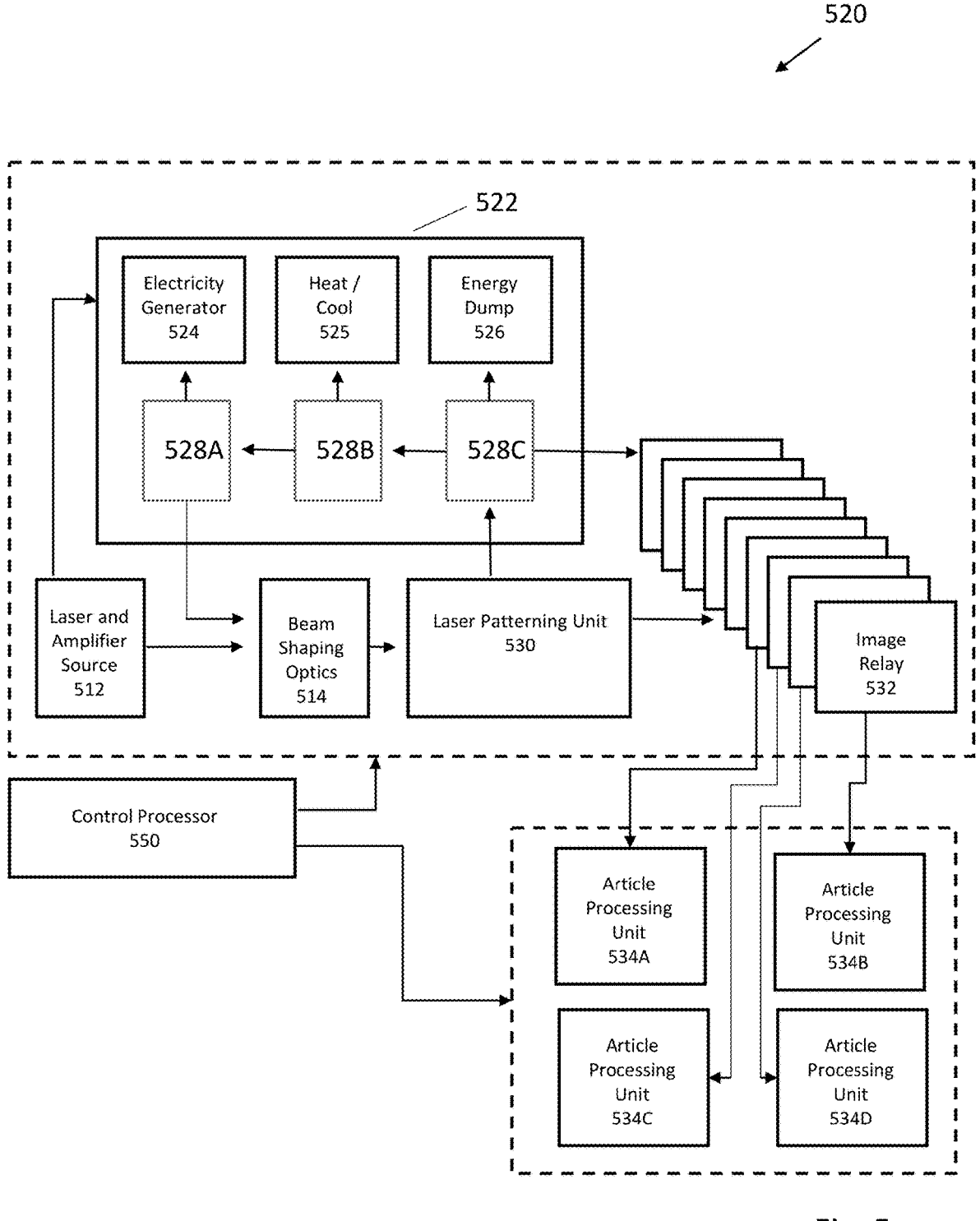
FIG. 5 is one embodiment of an additive manufacturing system that includes a light valve based on a phase change addressing and/or modulating layer and a switchyard system enabling reuse of patterned two-dimensional energy.

FIG. 5 is one embodiment of an additive manufacturing system that includes a phase change light valve and a switchyard system enabling reuse of patterned two-dimensional energy. An additive manufacturing system 520 has an energy patterning system with a laser and amplifier source 512 that directs one or more continuous or intermittent laser beam(s) toward beam shaping optics 514. Excess heat can be transferred into a rejected energy handling unit 522 that can include an active light valve cooling system. After shaping, the beam is two-dimensionally patterned by an energy patterning unit 530, with generally some energy being directed to the rejected energy handling unit 522. Patterned energy is relayed by one of multiple image relays 532 toward one or more article processing units 534A, 534B, 534C, or 534D, typically as a two-dimensional image focused near a movable or fixed height bed. The bed be inside a cartridge that includes a powder hopper or similar material dispenser. Patterned laser beams, directed by the image relays 532, can melt, fuse, sinter, amalgamate, change crystal structure, influence stress patterns, or otherwise chemically or physically modify the dispensed material to form structures with desired properties.

In this embodiment, the rejected energy handling unit has multiple components to permit reuse of rejected patterned energy. Coolant fluid from the laser amplifier and source 512 can be directed into one or more of an electricity generator 524, a heat/cool thermal management system 525, or an energy dump 526. Additionally, relays 528A, 528B, and 528C can respectively transfer energy to the electricity generator 524, the heat/cool thermal management system 525, or the energy dump 526. Optionally, relay 528C can direct patterned energy into the image relay 532 for further processing. In other embodiments, patterned energy can be directed by relay 528C, to relay 528B and 528A for insertion into the laser beam(s) provided by laser and amplifier source 512. Reuse of patterned images is also possible using image relay 532. Images can be redirected, inverted, mirrored, sub-patterned, or otherwise transformed for distribution to one or more article processing units 534A-D. Advantageously, reuse of the patterned light can improve energy efficiency of the additive manufacturing process, and in some cases improve energy intensity directed at a bed or reduce manufacture time.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. A transmissive light valve system, comprising a liquid crystal layer;

a first light patterning stack comprising a first semiconductor transparent electrode layer on a first wide bandgap semiconductor layer having a bandgap greater than 3 ev; and a second light patterning stack comprising a second semiconductor transparent electrode layer on a second wide bandgap semiconductor layer having a bandgap greater than 3 ev, wherein the first and second light patterning stacks bracket the liquid crystal layer, wherein the light valve operates at an energy density greater than 2 Joules/$cm^2$.

2. The light valve system of claim 1, wherein the first and second wide bandgap semiconductor layers have a bandgap greater than 4 eV.

3. The light valve system of claim 1, wherein the first and second wide bandgap semiconductor layers comprise at least one of a GaN semi-insulating layer, an iron doped compensated FeGaN semi-insulating layer, and a Carbon or Manganese doped compensated semi-insulating GaN, and a V-SiC semi-insulating layer acting as photoconductors in the light valve system.

4. The light valve system of claim 1, wherein the first and second semiconductor transparent electrode layers comprise at least one of n-epi GaN, n-epi SiC, ion implanted GaN, ion implanted SiC, and aluminum zinc oxide (AZO).

5. The light valve system of claim 1, further comprising:

a first alignment layer positioned between the first semiconductor transparent electrode layer and the liquid crystal; and a second alignment layer positioned between the second semiconductor transparent electrode layer and the liquid crystal.

6. The light valve system of claim 5, wherein at least one of the first and second alignment layers comprises a grown inorganic layer.

7. The light valve system of claim 5, wherein a monolithic stack comprises the liquid crystal layer, the first and second semiconductor transparent electrode layers, the first and second wide bandgap semiconductor layers, and the first and second alignment layers.

8. The light valve system of claim 7, wherein the monolithic stack further comprises at least one antireflective (AR) coating positioned to contact at least one of the first and second semiconductor transparent electrode layers, the first and second wide bandgap semiconductor layers, and the first and second alignment layers.

9. A monolithic transmissive light valve system, comprising a liquid crystal layer;

a first semiconductor transparent electrode layer on a first semi-insulating photoconductor layer comprising a first wide bandgap semiconductor layer;

a second semiconductor transparent electrode layer on a second semi-insulating photoconductor layer comprising a second wide bandgap semiconductor layer; and a plurality of alignment layers and antireflective layers monolithically formed on at least one of the first and semiconductor transparent electrode layers, and the first and second semi-insulating photoconductor layers, wherein the light valve system operates with an energy density greater than 2 Joules/$cm^2$.

10. A process for manufacturing a transmissive light valve system, comprising the steps of providing a liquid crystal layer;

positioning a first light patterning stack comprising a first semiconductor transparent electrode layer and a first photoconductor layer having a first semi-insulating semiconductor layer having bandgap greater than 3 ev in contact with the liquid crystal layer; and positioning a second light patterning stack comprising a second semiconductor transparent electrode layer and a second photoconductor layer having a second semi-insulating semiconductor layer having a bandgap greater than 3 ev in contact with the liquid crystal layer, wherein the light valve system operates with an energy density greater than 2 Joules/$cm^2$.

* * * * *